US008119223B2

(12) United States Patent
Morin et al.

(10) Patent No.: US 8,119,223 B2
(45) Date of Patent: Feb. 21, 2012

(54) MULTI-PLY TISSUE PAPER PRODUCT, PAPER CONVERTING DEVICE FOR A MULTI-PLY TISSUE PAPER PRODUCT AND METHOD FOR PRODUCING A MULTI-PLY TISSUE PAPER PRODUCT

(75) Inventors: Emmanuelle Morin, Vanves (FR); Philippe Albouze, Aveze (FR); Sarah Marinoni, Lurago Marinone (IT)

(73) Assignee: SCA Hygiene Products GmbH, Mannheim (DE)

( * ) Notice: Subject to any disclaimer, the term of this patent is extended or adjusted under 35 U.S.C. 154(b) by 413 days.

(21) Appl. No.: 12/307,189

(22) PCT Filed: Jun. 15, 2007

(86) PCT No.: PCT/EP2007/055964

§ 371 (c)(1),
(2), (4) Date: Feb. 4, 2009

(87) PCT Pub. No.: WO2008/125149

PCT Pub. Date: Oct. 23, 2008

(65) Prior Publication Data

US 2009/0255640 A1 Oct. 15, 2009

(30) Foreign Application Priority Data

Jul. 26, 2006 (WO) ................. PCT/EP2006/007409

(51) Int. Cl.

| | |
|---|---|
| *B32B 27/14* | (2006.01) |
| *B32B 3/00* | (2006.01) |
| *B31F 1/12* | (2006.01) |
| *D21H 27/40* | (2006.01) |

(52) U.S. Cl. ......... 428/172; 428/153; 428/154; 428/198

(58) Field of Classification Search .................. 428/153, 428/154, 156, 166, 172, 198
See application file for complete search history.

(56) References Cited

U.S. PATENT DOCUMENTS

| | | | | |
|---|---|---|---|---|
| 5,840,404 | A | 11/1998 | Graff | |
| 5,846,636 | A * | 12/1998 | Ruppel et al. | 428/154 |
| 6,277,466 | B1 * | 8/2001 | McNeil et al. | 428/154 |

(Continued)

FOREIGN PATENT DOCUMENTS

| | | |
|---|---|---|
| EP | 1209289 | 5/2002 |
| EP | 1321576 | 6/2003 |

(Continued)

OTHER PUBLICATIONS

International Search Report dated Sep. 8, 2008, in PCT application.

*Primary Examiner* — Catherine A Simone
(74) *Attorney, Agent, or Firm* — Young & Thompson

(57) ABSTRACT

A multi-ply tissue paper includes at least two plies of tissue paper, including a first ply (2) being provided with a first embossing pattern forming cushions (24), each cushion being shaped in the form of at least a part of a first motive (20); and a second ply (3) being provided with a second embossing pattern forming protrusions (32, 34), each protrusion forming at least a part of a second motive (30); and at least the first ply and the second ply are combined together such that the protrusions of the second ply are generally positioned inside the cushions of the first ply and the motives are aligned with one another.

23 Claims, 8 Drawing Sheets

U.S. PATENT DOCUMENTS

| | | | | |
|---|---|---|---|---|
| 6,395,133 | B1 | 5/2002 | McNeil | |
| 6,440,564 | B1 | 8/2002 | McLain | |
| 7,871,692 | B2 * | 1/2011 | Morin et al. | 428/172 |
| 2002/0048662 | A1 * | 4/2002 | Bredahl et al. | 428/195 |
| 2003/0021953 | A1 * | 1/2003 | Graff | 428/153 |
| 2003/0026953 | A1 | 2/2003 | Muller | |

FOREIGN PATENT DOCUMENTS

| | | |
|---|---|---|
| WO | 9945205 | 9/1999 |
| WO | 2006136186 | 12/2006 |

* cited by examiner

A - A
2
20
22
24
A

B - B
3
30
32
34
B

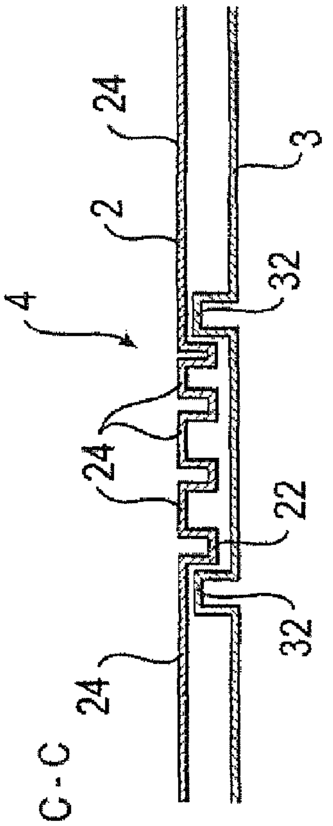
Fig. 1c
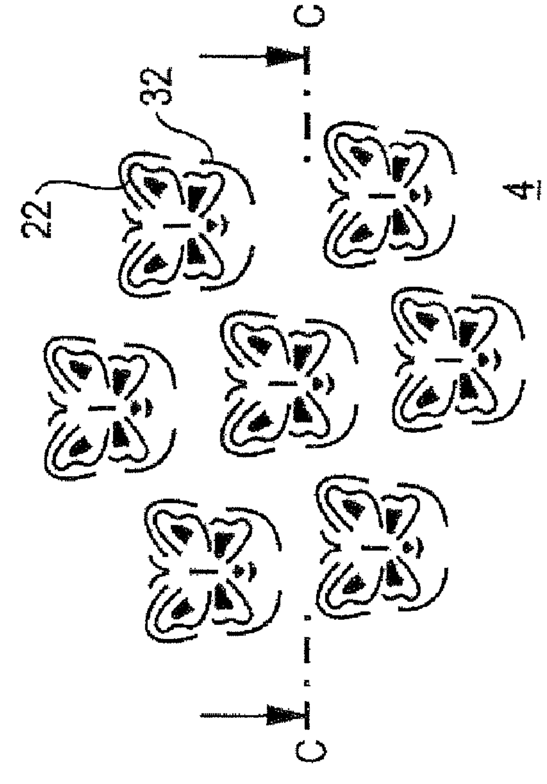

a) b) c)

a) b) c)

MULTI-PLY TISSUE PAPER PRODUCT, PAPER CONVERTING DEVICE FOR A MULTI-PLY TISSUE PAPER PRODUCT AND METHOD FOR PRODUCING A MULTI-PLY TISSUE PAPER PRODUCT

FIELD OF THE INVENTION

The invention relates to a multi-ply tissue paper product having at least two plies of tissue paper, a paper converting device for producing a multi-ply tissue paper product having at least two plies of tissue paper and a method for producing a multi-ply tissue paper product.

Multi-ply tissue paper products are usually planar products consisting of at least two layers of tissue paper, the volume of which usually being increased by means of an embossing process. The embossing process and the subsequent increase of volume, which is also known as a bulking process, may affect the optical and haptical appearance of the tissue paper product. At the same time, it may affect and/or alter some technical properties of the tissue paper product such as the absorption properties, the tear strength and/or the rigidity of the final product, etc. When a tissue paper product, or a similar paper product, is provided with an embossment, the properties of touch and feel can thereby be altered and/or improved in addition to an enhanced optical appearance. In addition to these properties of touch and feel, the absorption properties of the product may also be improved by embossing the tissue plies.

Tissue paper products such as handkerchiefs, cosmetic wipes, bathroom tissues, serviettes/napkins, facials or household towels are being distinguished from other paper products by their low basis weight and its significantly improved tensile energy absorption index.

As far as a method and product according to the invention are concerned, a wide variety of materials can be used, in particular, paper: tissue (creped or uncreped, wet-laid, single-layered or multi-layered), absorbent cotton; textiles: all soft textiles, woven fabrics, so-called "non-wovens" (e.g. dry-laid), textile laminates; or synthetics: all soft plastics such as foil or fiber composites.

In the field of multi-ply tissue paper products for sanitary and/or domestic use, it is known to manufacture tissue paper products consisting of several plies of absorbent paper, for example made of creped cellulose wadding with a density of between 10 and 30 g/$m^2$ per ply and provided with protuberances which are obtained by embossing.

In the field of tissue paper products for sanitary and/or domestic use, there is a constant need for improvement with regard to usability of a tissue paper product and its haptical and optical appearance.

Recent developments suggest multi-ply tissue paper products that provide two different sides that are optimised each with regard to different functionalities and/or tasks. For example, one side (the upper side of the planar tissue paper product, for example) of the tissue paper product has superior liquid absorbing properties, whereas the other side (the lower side of the tissue paper product, for example) is somewhat rough to provide an effective means for scrubbing away dirt. A structure like this is very efficient as a kitchen towel product, a cleaning wipe or any other tissue paper product that is used for cleaning. The aforementioned, two-sided structure can also effectively be used in the field of sanitary papers, in particular toilet paper.

To improve the handling and usability of two-sided tissue paper products, it is essential to communicate the existence of the two different sides, the actual orientation of the different sides (upper side vs. lower side of the planar tissue paper product), as well as the respective functionalities of the different sides. Accordingly, it is necessary to communicate the two sides and/or dual function of the multi-ply tissue paper product in an efficient and clearly understandable way, such that the user instantly understands that one side is, for example, for tasks requiring a superior absorption and the other side is for tasks requiring a scrubbing effect. The fact that tissue paper products can be held by the user in different orientations increases the need of clear communication.

PRIOR ART

In multi-layer products, tissue is embossed using a single nip or multi-nip embossing. The ply bonding of the single plies is provided by a mechanical embossing or by using an adhesive. In the case of three or multi-ply products, a plurality of plies are generally embossed together to provide volume to the product. However, the embossing usually hardens the product and contributes to a rough feeling of the product. On the other hand, it is possible to use a microembossing with a high density of protuberances to provide an embossed product which feels soft. However, microembossed paper feels as if could not absorb enough liquid. Therefore, there is a constant desire to provide a tissue product with a high softness surface and sufficient bulk.

WO 99/45205 describes a multi-ply tissue product with two embossed outer plies and a middle ply without embossing. Each of the outer plies is glue bonded to the middle ply.

There are several examples in the prior art, where two webs of tissue paper products are embossed such that protrusions formed on an embossing roll generate protuberances which are sized such that the two webs can be combined together so that the protuberances are nested into each other.

In a constant desire to provide a tissue product with a high softness surface and a sufficient bulk, EP 1 209 289 A1 suggests a special structure with a first web having micro protuberances which extend into cushions formed into a second web having a macro embossed pattern.

SUMMARY OF THE DISCLOSURE

Accordingly, it is an object of the present invention to provide an improved multi-ply tissue paper product which clearly communicates the existence and orientation of two different sides of the multi-ply tissue paper product. In addition to that, an object of the present invention is to provide a multiply tissue paper product that has an improved haptical and optical appearance, in particular with an improved hand feel. Additionally, it is an object of the present invention to provide a paper converting device for producing a multiply tissue paper product and a method for producing a multi-ply tissue paper product.

Accordingly, the invention resides in the provision of a multi-ply tissue paper product having at least two plies of tissue paper. A first ply is provided with a first embossing pattern forming cushions, whereas each cushion being shaped in the form of at least a part of a first motive. Furthermore, a second ply is provided with a second embossing pattern that forms protrusions, whereas each protrusion forms at least a part of a second motive. According to the disclosure, at least the first ply and the second ply are combined together such that the protrusions of the second ply are generally positioned inside the cushions of the first ply and the motives are aligned with one another.

By the provision of the first and the second motive, a clear distinction between the first ply, which is indicative of a first side of the multiply tissue paper product, and the second ply, which is indicative of the opposite side of the multi-ply tissue paper product, can be achieved. Depending on the first and second motive, a user can immediately see from the motive, which side of the multi-ply tissue paper product is currently oriented towards the surface or the body part to be treated. Furthermore, by embossing a pattern forming cushions and a pattern forming protrusions, two different hand feels and/or haptical experiences can be generated on the two different surfaces, leading also to a haptical distinction of the different sides of the finished two sided tissue paper product. This is mainly due to the fact that a ply provided with cushions generally has a smoother hand feel than a ply carrying protrusions. Furthermore, the bulk of the multi-ply tissue paper product is increased due to the positioning of the protrusions inside the cushions and the cushions are stabilised by the intruding protrusions.

Throughout this description, the term "motive" relates to a structure that represents a certain image, picture, word and/or pictogram, in particular a stylized, simplified and/or schematized one that can easily be recognised by a beholder. Such a motive could be, for example, an image of a flower or an animal or a geometric design, shape or the like.

In particular, by aligning the first motive relative to the second motive, it is possible to provide increased bulk, at least in the regions of the motives. In addition to that, providing the first and the second motives in an aligned manner leads to a situation in which the first motive and the second motive are basically inserted into one another. In case that the first and the second motives are being provided in an aligned manner, the distance between the first and the second motive should be in the range of from 0.5 mm up to S=m, preferably in the range of from 1.0 mm up to 3.0 mm.

Accordingly, the first and second motives may be situated in confined surface areas of the multi-ply tissue paper product, leaving other areas of the surface of the multi-ply tissue paper product without any motive embossing at all. In other words, areas with motives may be scattered over the surface area and are provided in an alternating manner with areas without motive embossing. Preferably less than 80% of the whole surface area of the multi-ply tissue paper product, especially less than 60% of the whole surface area of the multi-ply tissue paper product, may be covered with motives. This also improves the hand feel of the multi-ply tissue paper product since the areas in which the plies are bonded together alternate with other areas in which the plies are not bonded together. This leads to an improved softness of the multi-ply tissue paper product.

In a preferred embodiment, the cushions of the first ply are limited by regions of compressed material. Preferably, the regions of compressed material are formed following the outline of at least a portion of the motive of the respective cushion. In another embodiment, the regions of compressed material do not fully surround each cushion. The aforementioned embodiments allow the cushions to be formed by an embossing roller with embossing protrusions that produce, in conjunction with a rubber roll, the regions of compressed material and, thus, the cushions. This can be achieved by applying a so-called female embossing pattern using a female embossing tool. Such a female embossing tool has recesses into which the material of the planar initial product is pressed. When an embossing roller is positioned against an anvil roller, the ply material that enters the recesses is compressed to a much lower degree than the remaining material of the ply. Therefore, the material around the recesses in the female embossing tool becomes compressed and strengthened. For an explanation of a female embossing tool and the product obtained there from, reference is made to U.S. Pat. No. 6,440,564 B1.

The finished multi ply tissue paper product forms cushions in the first ply which are surrounded by regions of compressed material. On the other hand, the male protrusions serve to stabilize the cushions so that the optical appearance of the first ply having cushions surrounded by regions of compressed material is obtained. The use of a female embossing technique is further advantageous in that a female embossing leads to sharper corners than male protrusions have. When combining the plies together, the male protrusions do not destroy the optical appearance of the cushions.

According to another preferred embodiment, the protrusions of the second ply are formed of compressed material, Advantageously, the second motive is formed by a group of protrusions. In a preferred embodiment the protrusions do not fully surround the second motive. The protrusions of the second ply may have the shape of knobs as well as of lines.

In a preferred embodiment, the first motive and the second motive are matched with one another to produce a repeating pattern of areas of composite motives that are made up from first and second motives. This enables the provision of areas in which the first ply and the second ply are not at all attached to one another. Matching in this sense may be attributed to a matching of the motives with regard to their respective sizes in order to have motives of similar sizes such that the protrusions of the second motive can be inserted into the cushions of the first motive and leave, at the same time, spaces between the clusters of motives. Matching can also be attributed to the arrangement of one or several motives in patterns to achieve alignment of the motives of the first ply and the motives of the second ply.

In order to increase the bulk of the finished tissue paper product, the first motive and the second motive may have, in the combined condition made up of the first and the second ply, at least one section in which adjacent lines of the first motive and the second motive extend basically in parallel. These basically parallel adjacent lines may generally be formed by at least one section of regions of compressed material limiting the cushions of the first ply and one section of the protrusions of the second ply. Since the protrusions of the second ply are generally positioned inside the cushions of the first ply, the cushion can be stabilized by the protrusions.

In a preferred embodiment, the first and the second ply are combined in a synchronised manner to align the first and second motives with one another. This enables the provision of increased bulk via the interaction of the protrusions of the second ply with the cushions of the first ply, "Synchronised manner" means that the first ply and the second ply, and in particular the first motives and the second motives, are combined in a defined positional relationship with regard to one another. As a means for carrying out a synchronisation of the plies, the feeding velocities of the plies can be controlled in a nip for combining the plies.

According to a preferred embodiment the multi-ply tissue paper further comprises a third embossing pattern on the first ply forming second protrusions and a fourth embossing pattern on the second ply forming second cushions and being shaped in the form of at least a part of a third motive. The first ply and the second ply are combined together such that the second protrusions of the first ply are generally positioned inside the second cushions of the second ply. The first ply and the second ply have a complementary structure in which both plies have protrusions and cushions. The cushions and protrusions are arranged such that the protrusions of each individual ply are generally positioned inside the cushions of the other ply, respectively.

In order to increase the hand feel, the softness or the absorption properties of the multi-ply tissue paper product, a background embossing pattern can be present in the first and/or the second ply. In particular, the background embossing pattern can be a repetitive pattern, in particular a dot pattern that is imprinted in particular in a highly absorbent ply of the multi-ply tissue paper product. The background embossing pattern can be a microembossing pattern having at least 30 dots/$cm^2$, preferably having more than 40 dots/$cm^2$. However the background embossing pattern may also have less than 30 dots/$cm^2$, especially less than 20 dots/$cm^2$ and preferably less than 10 dots/$cm^2$.

In a preferred embodiment at least the first ply and the second ply show different material properties. In particular, the first ply can be made of a material with superior absorption proprieties and a high softness, whereas the second ply can be made of a rougher material offering better scrubbing properties. The different material properties can be achieved by pre-treating the plies or by the choice of the material of the plies.

It is appreciated that the first ply and the second ply are respectively situated on the outsides of the finished multi-ply tissue paper product, in other words, the first ply can be situated on the upper side of the finished multi-ply tissue paper and the second ply can be situated on the opposite lower side of the tissue paper product. This is independent on whether or not the first ply and/or the second ply comprise a plurality of different tissue paper layers that make up the first ply and/or the second ply.

Furthermore, to further increase the bulk of the finished tissue paper product, it is conceivable to situate at least a third ply between the first ply and the second ply. This third ply could also consist of a plurality of different tissue paper product layers or could be a non-woven or any other material suitable in this connection.

In another preferred embodiment the first embossing pattern and/or the second embossing pattern includes embossing with different heights of the protrusions. In particular, protrusions of a first height and protrusions of a second higher height may form parts of the second motive. Accordingly, the second motive may comprise protrusions of different heights. This may increase the degrees of freedom for the design of the second motive, in particular by attaching the first and second ply by means of an adhesive applied to the protrusions of the higher height only. In a further embodiment, the adhesive used can be a coloured adhesive, highlighting the protrusions of the higher height.

The first and the second ply may also be attached to one another by means of an adhesive applied on the compressed areas surrounding the female cushions.

Preferably, a coloured printing can be provided on one or both of the plies in order to clearly communicate to a user which side of the different sides is the currently visible side.

The paper converting device comprises a first embossing unit for embossing a first ply, the first embossing unit applying a first embossing pattern comprising cushions, each cushion being shaped in the form of at least a part of a first motive. The cushions can in particular be limited by regions of compressed material. This is typical for a female embossing unit, whereas in the case of a male embossing unit, the cushions would be compressed and stiffened. The paper converting device further comprises a second embossing unit for embossing a second ply, the second embossing unit applying a second embossing pattern comprising protrusions, each protrusion forming at least a part of a second motive which is formed by a male embossing unit. The protrusions are sized to fit into the cushions. Further, the paper converting device comprises a laminating unit for combining the first embossed ply and the second embossed ply together in a nested configuration such that the protrusions of the compressed material are placed inside the cushions in an aligned manner.

The method for producing a multi-ply tissue paper product comprises the steps of applying to a first ply a first female embossing pattern having cushions, each cushion being shaped in the form of at least a first motive, followed by applying to a second ply a second male embossing pattern having protrusions, each protrusion forming at least part of a second motive. In a following step, the first and second embossed plies are combined in a nested configuration placing the protrusions of compressed material inside the cushions in an aligned manner.

In order to obtain the desired stabilizing effect alongside with the desired communication properties of the two-sided multi ply tissue paper product, the cushions are at least partially filled by the male element or elements. The cushions and the male elements do not necessarily have to be positive fitting. Male elements have to be large enough to fill a sufficient area in order to stabilize the cushion. On the other hand, smaller male elements allow easier nesting of the two embossed webs and further contribute to an increased volume of the product. General devices for nesting two embossed webs are well known in the art. Such a known device might be retooled using the above-described embossing units as micro-embossing nips in order to produce firm and stabile cushions.

According to a preferred embodiment of the tissue paper converting device, the first embossing unit and/or the second embossing unit each comprising an embossing roller and an anvil roller, respectively, wherein the first embossing roller has at least one female element (recess) for generating the cushions surrounded by regions of compressed material and/or the second embossing roller has at least one male element for generating the protrusions of compressed material. In other words, the first embossing roller has at least one female element (recess) which produces the cushions.

According to a preferred embodiment of the invention, the first embossing roller and/or the second embossing roller can have both male and female embossing elements at the same time. This makes it possible to generate a complex pattern with e.g. an additional design embossing.

Preferably, the paper converting device further comprises a marrying roll cooperating with and being positioned against the embossing roller of the second embossing unit. In order to achieve the desired exactly nested and/or aligned configuration, the paper converting device should further comprise a synchronisation unit.

The resulting multi-ply tissue paper according to the invention has an optical appearance and can clearly be identified as a two-sided tissue product. By using the paper converting device and the method for producing such a tissue paper according to the invention it is possible to choose a communication topic and to develop respective motives which fit to this communication topic.

BRIEF DESCRIPTION OF THE DRAWINGS

In the following, exemplary embodiments of the disclosure, which are not intended to limit the scope of the attached claims, will be described in detail, based on several schematic drawings in which:

FIG. 1*c* is a schematic top view and a schematic cross sectional view of a multi-ply tissue paper product consisting of the first ply of FIG. 1*a* and the second ply of FIG. 1*b;*

DETAILED DESCRIPTION OF PREFERRED EMBODIMENTS

Figures 1A, 1B:
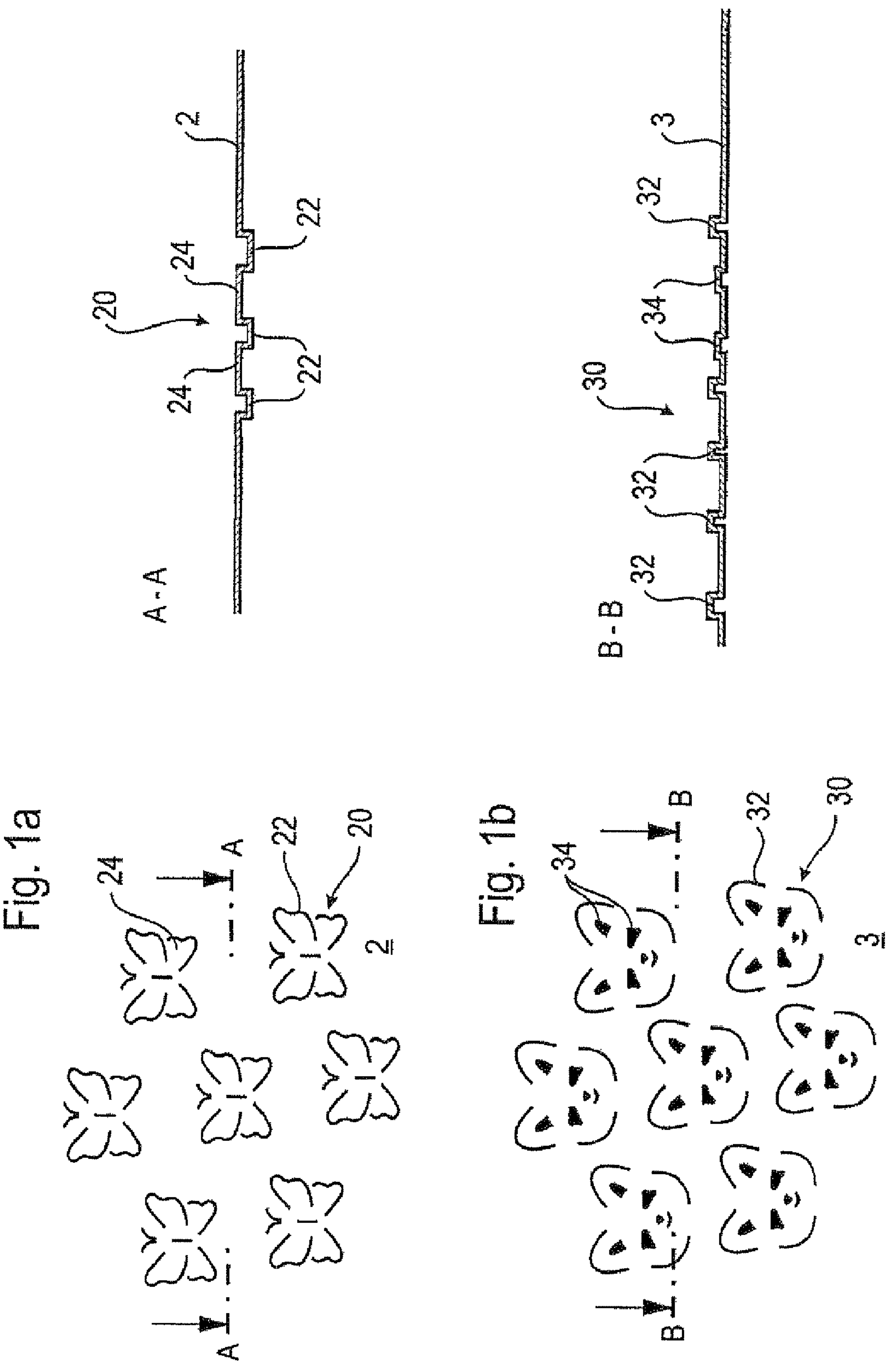
FIG. 1*a* is a schematic top view and a schematic cross sectional view of a ply having a female embossed pattern (cushions) therein.
FIG. 1*b* is a schematic top view and a schematic cross sectional view of a second ply having a male embossed pattern (protrusions) therein.
Figure 2:
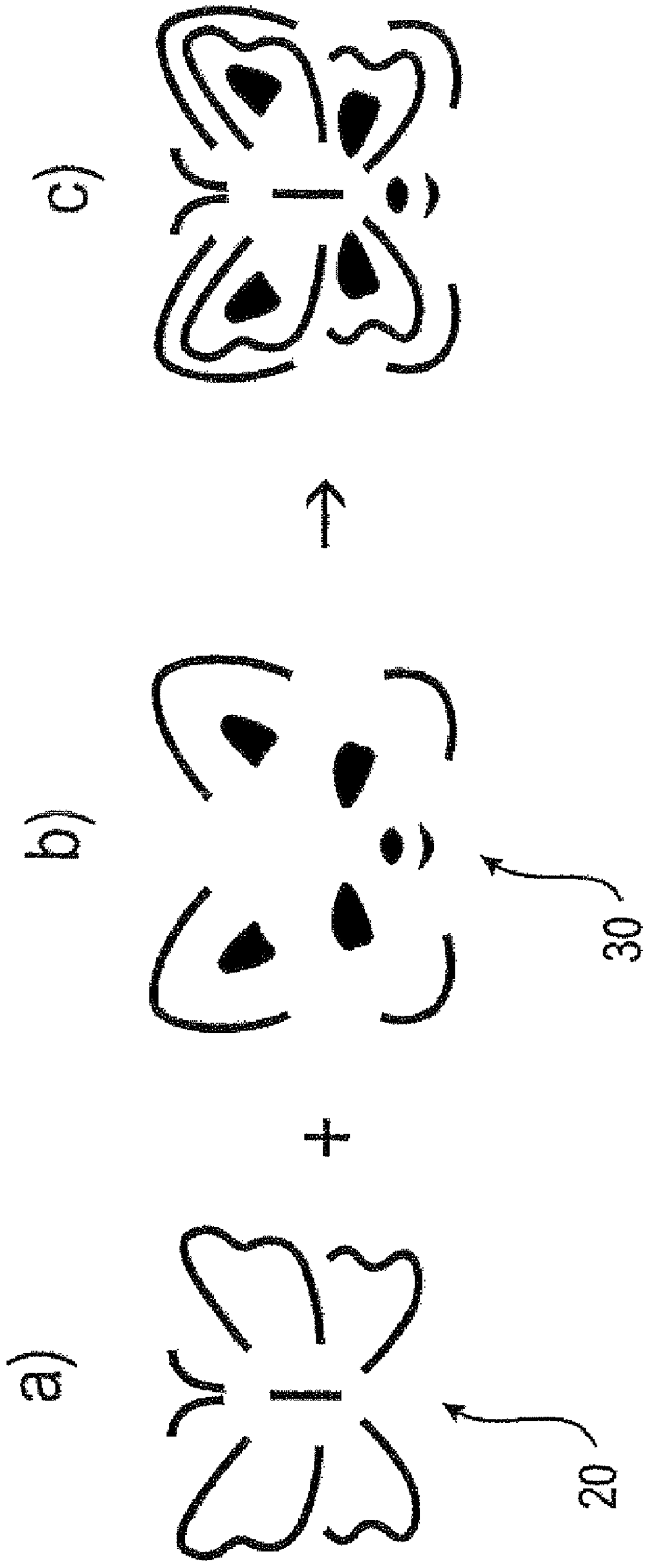
FIGS. 2*a*-2*c* are schematic top views of the first embossing pattern (FIG. 2*a*), the second embossing pattern (FIG. 2*b*), and the resulting combined embossing pattern (FIG. 2*c*)

In the following, embodiments of the disclosure will be described in detail with reference to the drawings. Throughout the drawings, the same elements will be denoted by the same reference numerals.

Throughout this description, the term "motive" relates to a structure that represents a certain shape image, picture, word and/or pictogram, in particular a stylized, simplified and/or schematized one that can easily be recognised by a beholder. Such a motive could be, for example, an image of a flower or an animal or a geometric design or the like.

A first preferred embodiment of the present disclosure is shown in FIGS. 1*a* to 2*c*, as will be described in the following. FIG. 1*a* shows a top view and a cross-sectional view along line A-A of the top view of a first ply 2. In the top view, a motive 20 is clearly visible that is formed by cushions 24. The motive 20 resembles the schematic image of a butterfly.

In the cross section in FIG. 1*a*, that is taken along line A-A as it is shown in the top view, it can be seen that the cushions 24 are limited by regions 22 of compressed material. The regions 22 of compressed material basically extend around at least parts of the outline of the motive 20. In other words, the cushions 24 that are formed in the form of a butterfly are not completely surrounded by the regions 22 of compressed material but there are some sections that are open to the material surrounding the butterfly.

In FIG. 1*a* it is also visible that between the cushions 24 in the form of the motive 20 there are regions of the tissue ply 2 that are not at all embossed with a motive but are left plain. Due to the scattering of the motives over the ply 2, the softness of the finished tissue paper product can be upheld.

FIG. 1*b* shows a second motive 30 that resembles the schematic image of a face of a cat. As can be seen in the schematic cross section along line B-B in FIG. 1*b*, protrusions 32, 34 that form the motive 30 have different heights. In particular, the elements that symbolise the eyes and the ears of the cat are made of protrusions 34 of a lesser height than the protrusions 32 that form the remaining outline of the motive. Due to the different heights, it is possible to highlight the sections that have a higher height, in particular by applying a colour to these protrusions. In particular, coloured glue could be applied to the higher protrusions 32. The protrusions of FIG. 1B may have the shape of knobs as well as of lines.

FIGS. 1*c* and 2*c* show the multi-ply tissue paper product 4 in its composed condition. It is to be understood that the top views shown in FIGS. 1*c* and 2*c* are only a virtual top views showing schematically the position of the motives 20 and 30 of the first and second plies 2, 3. It is in particular appreciated that only one motive 20, 30 is visible at a time, depending on the side of the finished tissue paper product 4, that is viewed. In other words, either the first ply 2 with the first motive 20, or the second ply 3 with the second motive 30 can be seen. As can be seen in the cross section along line C-C in FIG. 1*c*, the protrusions of the cat motive 30 are positioned inside the cushions 24 of the butterfly motive 20.

FIG. 1*c* also shows that sections of the protrusions 32 of the cat motive 30 of the second ply 3 that are adjacent to regions 22 of compressed material of the first ply 2, are basically aligned in parallel to the parts of the regions 22 of compressed material. This is in particular the case around the outside of the "front wings" of the butterfly motive 20, which are aligned almost in parallel with the outline of the ear protrusion 32 of the cat motive. This can also be seen in FIG. 2*c*.

FIGS. 2*a* to 2*c* clearly show that motive 20 (butterfly) and motive 30 (cat) are matched such that they have nearly identical dimensions in order to allow the protrusions 32, 34 of the cat motive 30 to enter into the cushions 24 of the butterfly motive 20. In particular certain sections of the motives 20, 30 are aligned such that the protrusions 32 of motive 30 basically extend in parallel to the regions 22 of compressed material of motive 20.

FIG. 2*a* is also the view a user would see when looking onto the finished tissue paper product 4 towards the first ply 2, and FIG. 2*b* is the view a user would see when looking towards the second ply 3. In other words, a user would either see motive 20 or motive 30, depending on the side of the tissue paper product 4 she or he is looking at. This enables a clear distinction of the two different sides of the tissue paper product.

It is to be noted that the material of the first ply 2 and the material of the second ply 3 may have different material properties, in particular different absorption properties and/or different roughness. The different material properties can be achieved either by pre-treating the respective material, in particular by micro-embossing, or by using different types of material.

Figure 6A:
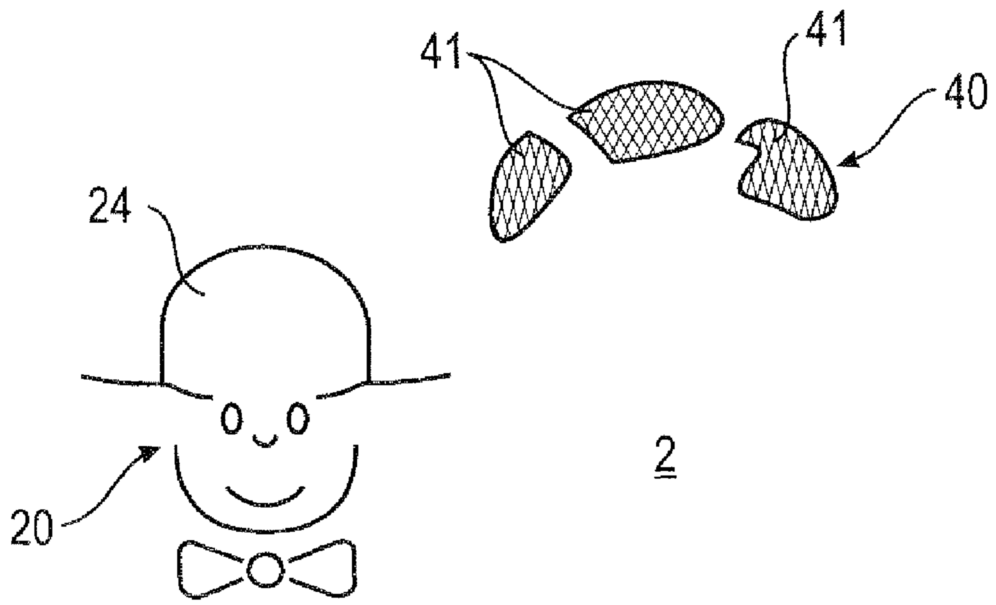
FIGS. 6*a*-6*c* are schematic top views of yet another embodiment of the present invention.
Figure 6B:
Figure 6C:
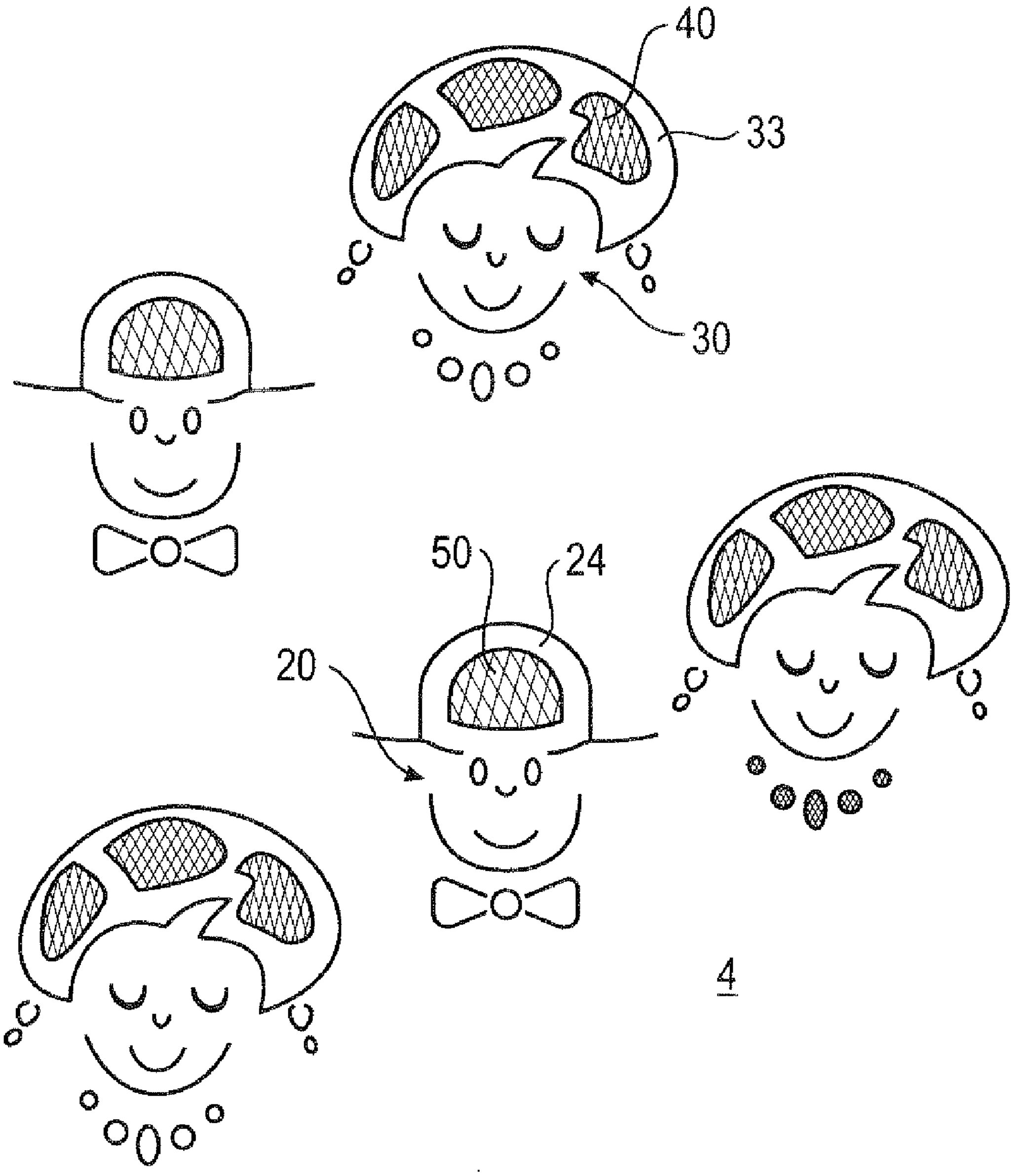

FIGS. 6*a*, 6*b* and 6*c* show a different embodiment of the invention. FIGS. 6*a* and 6*b* correspond to FIG. 1*a* and FIG. 1*b*, i.e. they are top views of two different plies. FIG. 6*c* corresponds to FIG. 1*c* which is the multi-ply tissue paper product in its composed condition.

FIG. 6*a* is the top view on a first ply 2 with a motive 20, at least part of which comprises a cushion 24 which has a female shape. The other parts of the motive 20, in the specific embodiment as shown exemplified by a man, can be embossed in any desired way. What is decisive is that the region of the hat of the man forming the motive 20 is made of a cushion 24. On the same side of the ply 2, there is a further embossing pattern 40 also forming a motive in the sense of the present application. The motive 40 can be composed of different, discrete embossing protrusions 41. The motive 40 can be selected so as to fit to the motive 20. In the present case, it can be something which can be related to the man as shown as motive 20, e.g. the motive of a pipe, a car, a tie. The motive 40 is formed by a male protrusion, i.e. it projects over the main surface of the ply 2 in the plane of drawing 6*a*.

The second ply 3 is formed in a similar way. The motive 30 as shown is exemplified by the female shape as depicted. It is made of several, individual embossing geometries, the most important being the hair 33 which is formed as a female shape or, in other words, forms a cushion comparable to the hat 24 in the male motive 20. The other parts of the motive 30 according to FIG. 6*b* can be formed in any desired way. In addition to the motive 30, ply 3 also shows a motive 50 which can consist of one or a plurality of discrete protrusions. Such a motive 50 could be selected to fit to the context of the motive 30. In the specific case as shown in FIG. 6*b*, in which motive 30 shows a woman, the protrusion or protrusions 50 could e.g. resemble a handbag or a flower.

Plies 2 and 3 are combined together in such a way that the two surfaces facing the viewer in FIGS. 6*a* and 6*b* are brought together and are facing each other in the combined product. The resulting structure is as shown in FIG. 6*c*. The individual motives overlap each other and the male protrusions 40 and 50 are used to stabilize the cushions 24 and 33 of motives 20 and 30, respectively. As indicated above with regard to FIGS. 1*c* and 2*c*, FIG. 6*c* has also to be understood such that the top view shown in FIG. 6*c* is only a virtual view showing schematically the position of the motives 20, 30, 40 and 50 of the first and second ply 2, 3. On one side of the composed tissue paper product 4, the motives 20 and 40 are to be seen, whereas on the opposite side of the composed tissue paper product 4, motives 30 and 50 are visible. However, the two plies are composed in such a way that the protrusions 40 serve to stabilize the cushion 33 of motive 30, whereas the protrusion 50 serves to stabilize the cushion 24 of motive 20.

Figure 3:
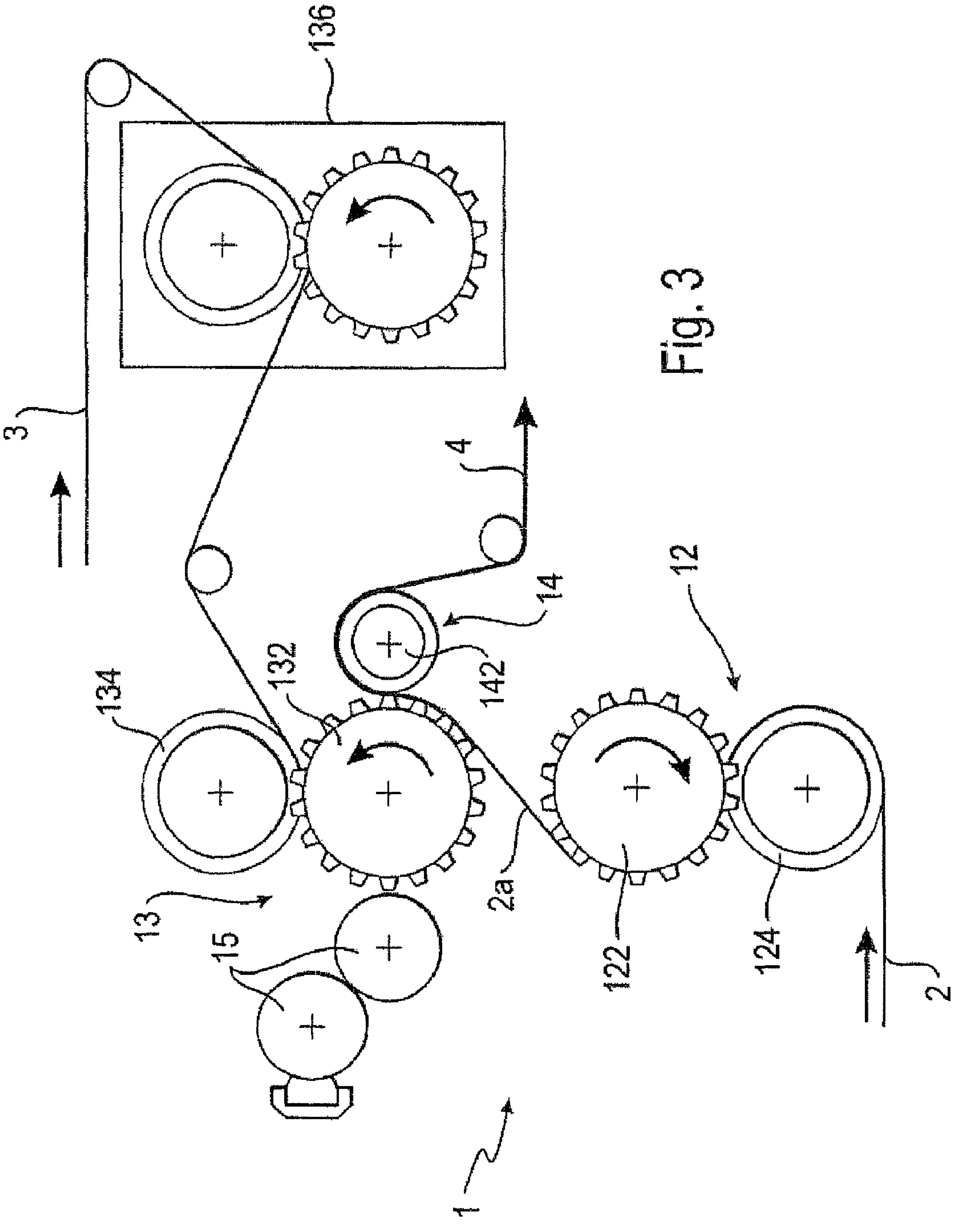
FIG. 3 is a schematic view of a paper converting device for producing a multi-ply tissue paper product according to the invention.

FIG. 3 shows a schematic view of a paper converting device for producing the multi-ply tissue paper product described above. The paper converting device 1 comprises a first embossing unit 12, a second embossing unit 13, and a lamination unit 14. The first embossing unit comprises an embossing roller 122 and an anvil roller 124. The second embossing unit comprises an embossing roller 132 and an anvil roller 134. The second embossing unit 13 might further comprise a pre embossing unit 136. This additional embossing unit might be used in order to enhance the embossing of the male pattern.

A first ply 2 comprising one or more layers of tissue paper, preferably two layers, is supplied to the anvil roller 124 of the first embossing unit. The incoming ply 2 is embossed between the rollers 122, 124 at least with motive 20. Although only shown schematically in FIG. 3, there is a difference between embossing rollers 122 and 132. For the embodiments according to FIGS. 1 and 2, the embossing roller 122 is the so-called female embossing tool having recesses which form the cushions 24 as shown in FIG. 1*a*. For the embodiment according to FIG. 6, the embossing roller 122 has both recesses which form cushions as well as protrusions to form the additional male protrusion or protrusions of the individual ply. For the example as shown in FIG. 6*a*, the embossing roller 122 forms both the motive 20 and motive 40. As explained above, at least part of the motive 20, namely the cushion 24, is a female shape whereas the motive 40 and, optionally, further parts of the motive 20 are of a male shape. According to this preferred embodiment of the invention, the first embossing roller as well as the second embossing roller should comprise a male and a female motive, whereby the male motive of the first roller should stabilize the female cushions of the second roller and vice versa.

A second ply 3 comprising one or more layers of tissue paper, preferably two layers, is supplied to the embossing unit 13. The incoming ply 3 is embossed between the rollers of the pre embossing unit 136 as well as between the rollers 132, 134 of the second embossing unit 13. For the embodiments according to FIGS. 1 and 2, the motive 30 is embossed between the rollers 132 and 134 of the second embossing unit 13. For the embodiment according to FIG. 6, the second embossing unit 13 forms both the motive 30 and motive 50. This means, that the embossing roller 132 has both recesses for forming the female embossed cushion 33 as well as protrusions for forming the male embossed projections forming motive 50 and, where applicable, parts of the motive 30 of the cushion 33. A pre-embossing unit might serve to provide the ply with a micro-embossing pattern before entering the embossing unit 12 or 13. However, it should be noted that it is also possible to provide such a pre-embossing station for both plies or not to pre-emboss any of the plies.

For bonding together the two embossed plies, different possibilities should be mentioned. Preferably, an adhesive is applied to generate a ply bonding between the plies. Therefore, glue application rollers 15 are provided which apply a transparent or coloured adhesive to either the first ply 2 or second ply 3. In the first case, the adhesive is applied to the regions 22 of compressed material, whereas in the later case, the adhesive is combined to the tops of the (higher) male protrusions 32. As a further alternative, it is also possible to apply an adhesive to both the male protrusions 32 and regions 22 of compressed material. In the example shown in FIG. 3, the adhesive is applied by means of the glue application rollers 15 to ply 3 such that the male protrusions receive adhesive on their tops.

In a next step, the then embossed plies 2*a*, 3*a* are combined together to form a nested configuration. A roller 142 serves as a marrying roller. By passing through the nip between the embossing roller 132 and the marrying roller 142, the two plies 2*a*, 3*a* are pressed together.

The multiply tissue paper product 4 formed in such a way preferably comprises a first ply 2 having two layers of tissue paper and having at least a female pattern embossed therein, as well as a ply 3 having two layers of tissue paper having at least a male pattern embossed. The multiply tissue paper product 4 might be further processed by applying color and/or design patterns.

Instead of a ply 2 and/or a ply 3 having two layers of tissue paper, plies having only one layer or plies having more than two layers of tissue paper might be processed in the embossing units 12, 13. The number of layers in the ply 2 does not necessarily correspond to the number of layers in ply 3.

The rollers of the first embossing unit 12 and the second embossing unit 13 are synchronized by a synchronization unit (not shown in FIG. 3) so that the male protrusions enter the cushions and stabilize them in the desired way. The synchronising unit ensures in particular that for the embodiments of FIGS. 1 and 2 the motives 20, 30 are aligned in the manner described above, whereas for the embodiment of FIG. 6, the motives 30 and 40 as well as 20 and 50 are aligned, respectively.

Figure 4:
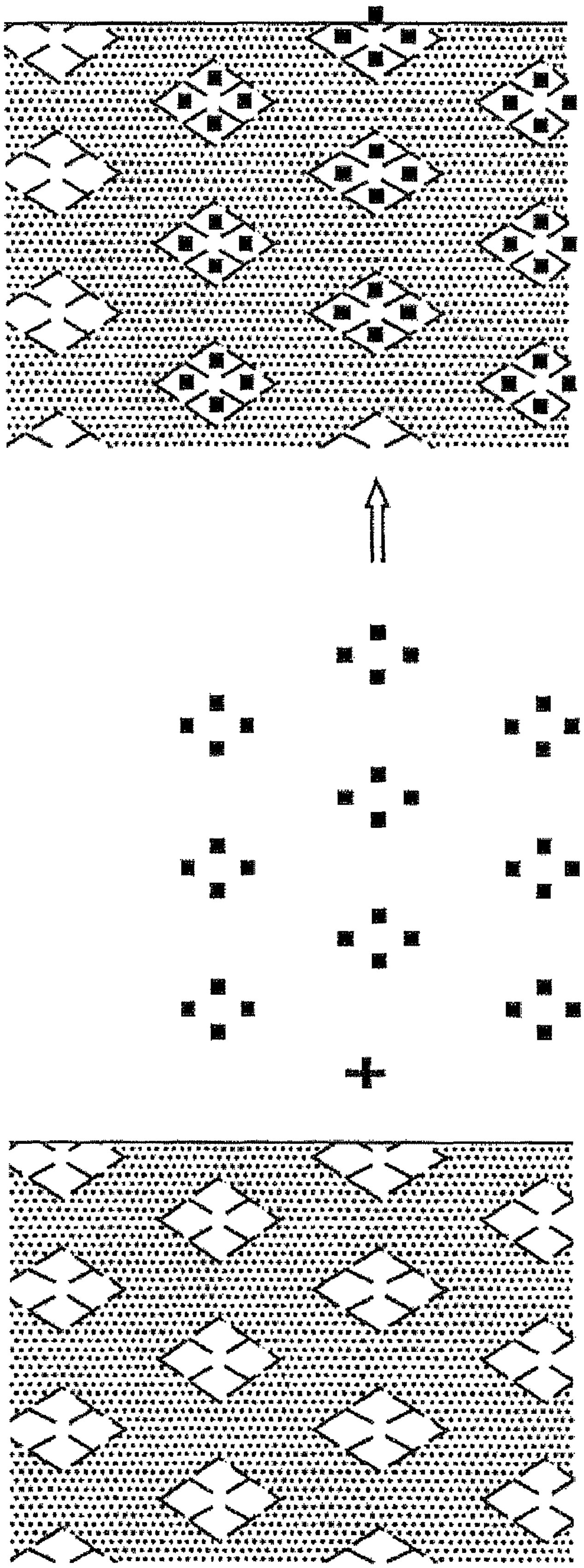
FIGS. 4*a*-4*c* are schematic top views of another embodiment of the present invention.

FIG. 4 shows alternative patterns for the first motive 20 and the second motive 30. In particular, FIG. 4*a* shows a cushion pattern in combination with a dot embossing pattern and FIG. 4*b* shows a protrusion pattern, FIG. 4*c* shows, in a virtual view, the combination in a top view of a first ply according to FIG. 4*a* according to FIG. 4*b*.

Figure 5:
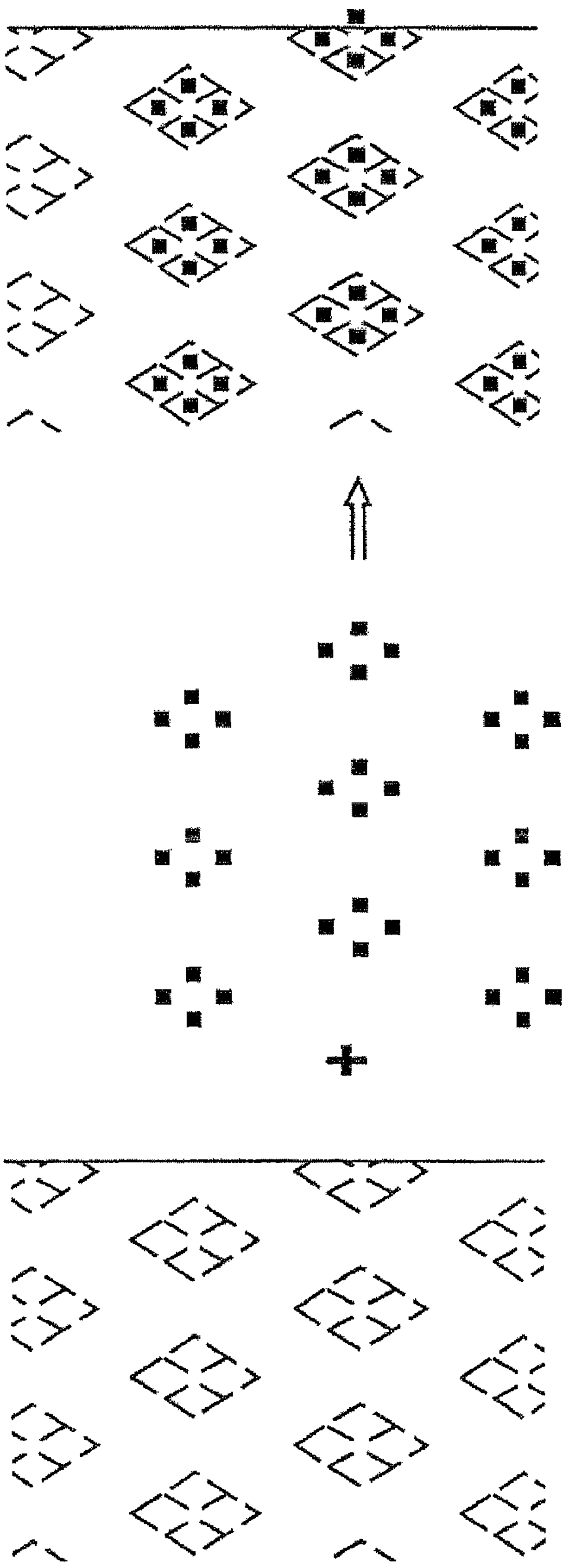
FIGS. 5*a*-5*c* are schematic top views of yet another embodiment of the present invention.

The same is the case for the embodiments shown in FIGS. 5*a*-5*c*, in which FIG. 5*a* shows a cushion pattern of first ply and FIG. 5*b* shows a protrusion pattern of a second ply whereas FIG. 5*c* shows, in a virtual view, the combined pattern in a schematic top view.

All patterns shown in the embodiments are described by way of example only to show as a further common feature that the clearly distinguishable motives of the first ply and of the second ply are grouped in one position such that there is plenty of space between the motives that is not embossed with any motive at all. When attaching the two plies together by applying an adhesive onto the protrusions and marrying the two plies together, the un-embossed areas provide an improved softness of the resulting multi-ply tissue paper product.

The invention claimed is:

1. A multi-ply tissue paper comprising at least two plies of tissue paper, with:

a first ply comprising a first embossing pattern forming cushions, each cushion being shaped in the form of at least a part of a first motive; and a second ply comprising a second embossing pattern forming protrusions, each protrusion forming at least a part of a second motive;

wherein a distance between the first and the second motive is in a range of from 0.5 mm to 5 mm, and at least the first ply and the second ply being combined together such that the protrusions of the second ply are generally positioned inside the cushions of the first ply and the motives are aligned with one another, so that the protrusions stabilize the cushions.

2. The multi-ply tissue paper according to claim 1, wherein the cushions of the first ply are limited by regions of compressed material.

3. The multi-ply tissue paper according to claim 2, wherein the regions of compressed material extend around at least a part of the outline of the motive of the cushion.

4. The multi-ply tissue paper according to claim 2, wherein the regions of compressed material do not fully surround each cushion.

5. The multi-ply tissue paper according to claim 1, wherein the second motive is formed by at least a group of protrusions.

6. The multi-ply tissue paper according to claim 1, wherein the protrusions do not fully surround the second motive.

7. The multi-ply tissue paper according to claim 1, wherein the first motive and the second motive are matched with one another to produce a repeating pattern of composite motives made up from first and second motives.

8. The multi-ply tissue paper according to claim 1, wherein the first motive and the second motive of the combined first and second plies have at least one section of basically parallel-adjacent lines.

9. The multi-ply tissue paper according to claim 8, wherein the basically parallel-adjacent lines are basically formed by at least one section of regions of compressed material limiting the cushions of the first ply and one section of the protrusions of the second ply.

10. The multi-ply tissue paper according to claim 1, wherein the first and second motives are grouped on the first and second plies, respectively.

11. The multi-ply tissue paper according to claim 1, wherein at least the first and the second ply are combined in a synchronized manner to align the first and the second motive with one another.

12. The multi-ply tissue paper according to claim 1, further comprising:

a third embossing pattern on the first ply forming at least one second protrusion;

and a fourth embossing pattern on the second ply forming second cushions and being shaped in the form of at least a part of a third motive; wherein the first ply and the second ply are combined together such that the at least one second protrusion of the first ply is generally positioned inside the second cushions of the second ply.

13. The multi-ply tissue paper according to claim 1, wherein a background embossing is present on the first and/or second ply.

14. The multi-ply tissue paper according to claim 1, wherein the first ply and the second ply constitute respective outer plies of the multi-ply tissue paper.

15. The multi-ply tissue paper according to claim 1, wherein the first embossing pattern and/or the second embossing pattern includes an embossing with different heights.

16. The multi-ply tissue paper according to claim 15, wherein protrusions of a first height and protrusions of a second, higher height form the second motive.

17. The multi-ply tissue paper according to claim 16, wherein at least the first ply and the second ply are attached to one another with an adhesive applied to the protrusions.

18. The multi-ply tissue paper according to claim 2, wherein at least the first ply and the second ply are attached to one another with an adhesive applied onto the compressed areas surrounding female cushions.

19. The multi-ply tissue paper according to claim 17, wherein the adhesive is only applied to the protrusions of the higher height.

20. The multi-ply tissue paper according to claim 17, wherein the adhesive is a coloured adhesive.

21. The multi-ply tissue paper according to claim 1, additionally comprising a color printing on one or more of the plies.

22. The multi-ply tissue paper according to claim 1, wherein the first ply and/or the second ply are composed of a plurality of tissue paper layers.

23. The multi-ply tissue paper according to claim 1, wherein the first ply has material properties different from that of the second ply, in different absorption properties and/or different stiffness.

* * * * *